Figure 3:
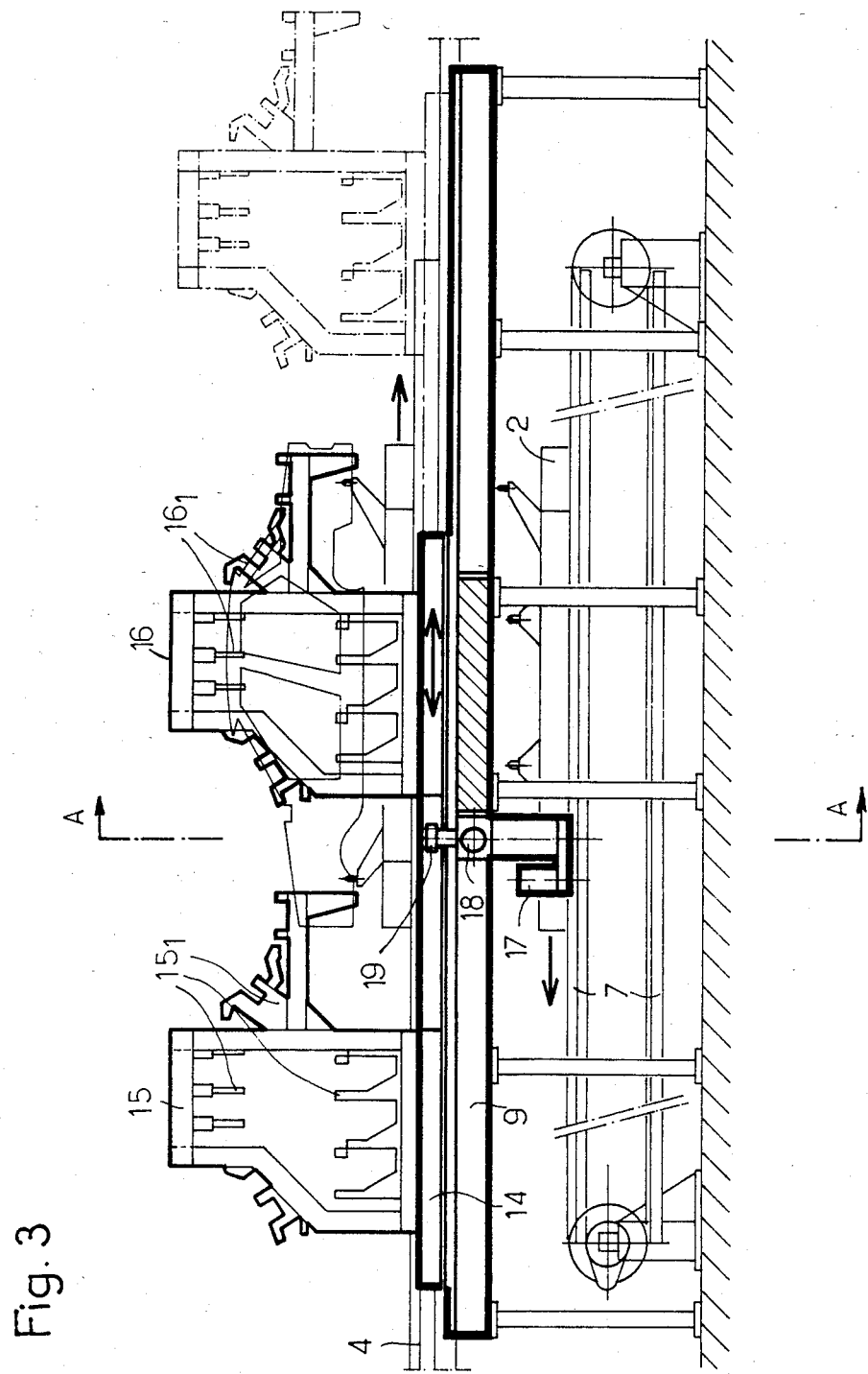

United States Patent [19]

Sciaky et al.

[11] Patent Number: 4,600,136
[45] Date of Patent: Jul. 15, 1986

[54] INSTALLATION FOR ASSEMBLING AND IN PARTICULAR PINNING CAR BODIES OF MOTOR VEHICLES

[75] Inventors: Mario Sciaky, Paris; Michel Leonard, Maisons Alfort; Pierre Jablonski, Creteil; Jean-Jacques Marianne, Combs la Ville, all of France

[73] Assignee: Sciaky S.A., Vitry sur Seine, France

[21] Appl. No.: 690,339

[22] Filed: Jan. 10, 1985

[30] Foreign Application Priority Data

Jan. 11, 1984 [FR] France ................................ 84 00373

[51] Int. Cl.⁴ ........................ B23K 37/02; B23K 37/04
[52] U.S. Cl. ...................................... 228/45; 228/4.1; 228/47; 228/49.1
[58] Field of Search ...................... 228/4.1, 7, 102, 45, 228/47, 49.1; 219/79, 80, 86.24; 901/6-8, 42; 414/222; 198/339; 29/822-824, 711, 791, 799

[56] References Cited

U.S. PATENT DOCUMENTS 4,162,387  7/1979  DeCandia ............................ 219/79
4,392,601  7/1983  Fujikawa et al. .................... 228/4.1

FOREIGN PATENT DOCUMENTS 2211384  12/1972  France .
2483285   5/1981  France .
56-39971   4/1981  Japan .
57-84275   5/1982  Japan .
57-104476  6/1982  Japan .
2090797A   7/1982  United Kingdom .................. 228/45

Primary Examiner—Kuang Y. Lin
Attorney, Agent, or Firm—Seidel, Gonda, Goldhammer & Abbott

[57] ABSTRACT

An installation for assembly and in particular for pinning the car bodies of motor vehicles, includes carriages for supporting the car bodies to be assembled by welding, and a conveyor track for displacing these carriages to an assembly station provided with welding equipment. The installation is characterized in that it includes a rigid and fixed stand, a rigid frame which reciprocates on the stand, and at least two gantry structures rigidly fixed to the frame, each gantry having apparatus for positioning and holding a particular model of car body to be welded, apparatus for reciprocating the frame on the stand in a direction parallel to the displacement of the carriages, and apparatus for locking the frame in relation to the stand so as to position one or other gantry in the assembly station.

3 Claims, 4 Drawing Figures

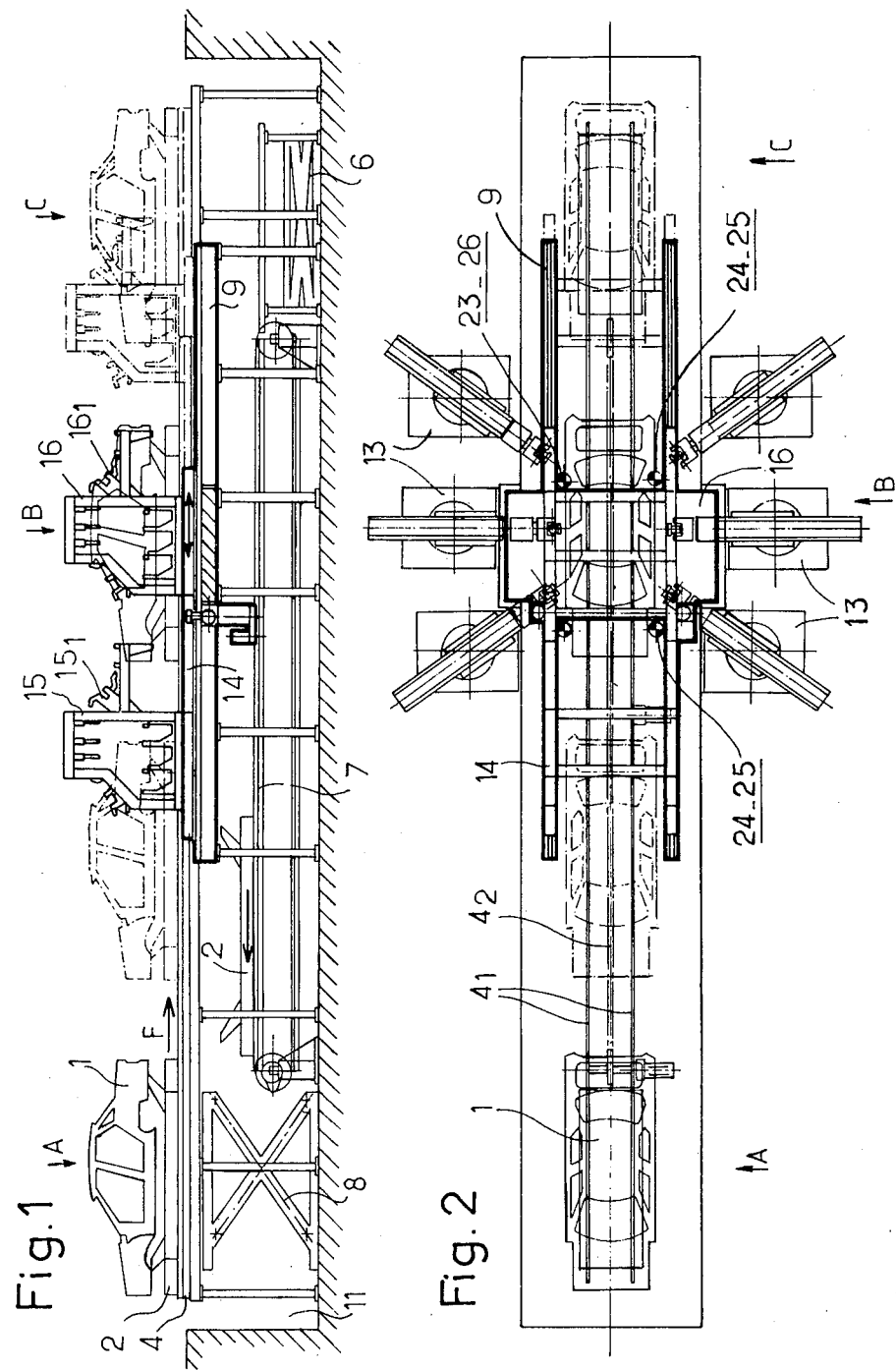

INSTALLATION FOR ASSEMBLING AND IN PARTICULAR PINNING CAR BODIES OF MOTOR VEHICLES

This invention relates to an installation for assembling and in particular for pinning the car bodies of motor vehicles.

The operation of pinning a car body of a motor vehicle has the object of assembling the main sub-assemblies of the car body, namely the underframe, the side panels and the roof, so as to position them in relation to each other for the final welding operation.

It is known that before this pinning is carried out, it is necessary to observe strict and accurate conditions for positioning the sub-assemblies in relation to each other, and that these conditions must be maintained throughout the operation of making the welding or pinning points which serve to fix the precise geometry of the whole car body before the final welding operation is carried out.

In the known techniques for manufacturing car bodies, the pinning operation is generally carried out in a particular station of the manufacturing chain preceding the final welding station. This assembly station for the pinning operation comprises elements for positioning and tightly holding together the sub-assemblies of the car body as well as welding elements, whose arrangement in relation to each other is adapted to the geometry of different sub-assemblies of the car body.

Modern installations incorporate the possibility of assembling several different models of car bodies in a particular chain, and the positioning and holding elements are mounted to be stationary on rigid structures which in turn are mounted to be removable on the stand of the installation. These removable structures are generally four in number due to the car body being constructed from sub-assemblies, namely one structure for the underframe, two structures for the side panels and one structure for the roof.

In these known installations, therefore, it is necessary to provide one set of structures for each model of car body as well as means for rapidly replacing the structures of one of these sets by structures of another set.

In installations of this type, the welding equipment is either fixed on the removable structures and can therefore be removed with them for exchange, or handled separately by programmed robots.

Experience has shown that installations designed with a view to being universally applicable and therefore adapted to receive several different car bodies are very limited in their use for certain practical reasons, such as the time required for placing into their operating positions the structures which are equipped with means for positioning the sub-assemblies, and the impossibility of using the same welding tools for all the different models of car bodies.

Furthermore, in practice, numerous manufacturing chains are provided for assembling one type of car bodies and one or two variations thereof, such as, for example, the basic four door model and its variations with two or five doors. In such a case, which occurs very frequently, these known installations have the disadvantage of being very complicated in construction and difficult to operate and keep in an operational state due to the fact that they use several sets of at least four interchangeable structures which must be handled by as many means for placing them in position and which must be positioned very accurately and held in position by numerous reference points.

It is one of the main objects of the present invention to overcome these disadvantages and in particular to provide an installation which can carry out the same functions but in which only a single interchangeable structure provided with all the positioning and holding devices required is used per model of car body to be assembled.

It is therefore possible to dispense with the operations hitherto required for putting the positioning devices in place and holding them in the correct positions in relation to each other and in relation to the reference points of the installation and to reduce to a minimum the operating means required for changing the pinning operation over from one car body model to another, and to increase the output by reducing the time required for adapting the installation to each car body model to be welded, and to enable the same welding apparatus to be easily used for the different car bodies.

The installation according to this invention comprises, for this purpose, carriages for supporting the car bodies which are to be assembled by welding and means for displacing these carriages to an assembly station provided with welding equipment, and it is characterised in that it comprises a rigid and fixed stand, a rigid frame which is movable on the stand and at least two gantry structures which are rigidly fixed on this frame, each gantry having positioning and holding means designed for a model of car body to be welded, means for displacing the frame on the stand in a direction parallel to the displacement of the carriages, and means for locking the frame in relation to the stand in order to position the one or other gantry in the assembly station.

According to another characteristic of the invention, the means for displacing the carriages are arranged in the interior of the stand and of the frame parallel to the direction of displacement of the frame on the stand.

Figure 4:
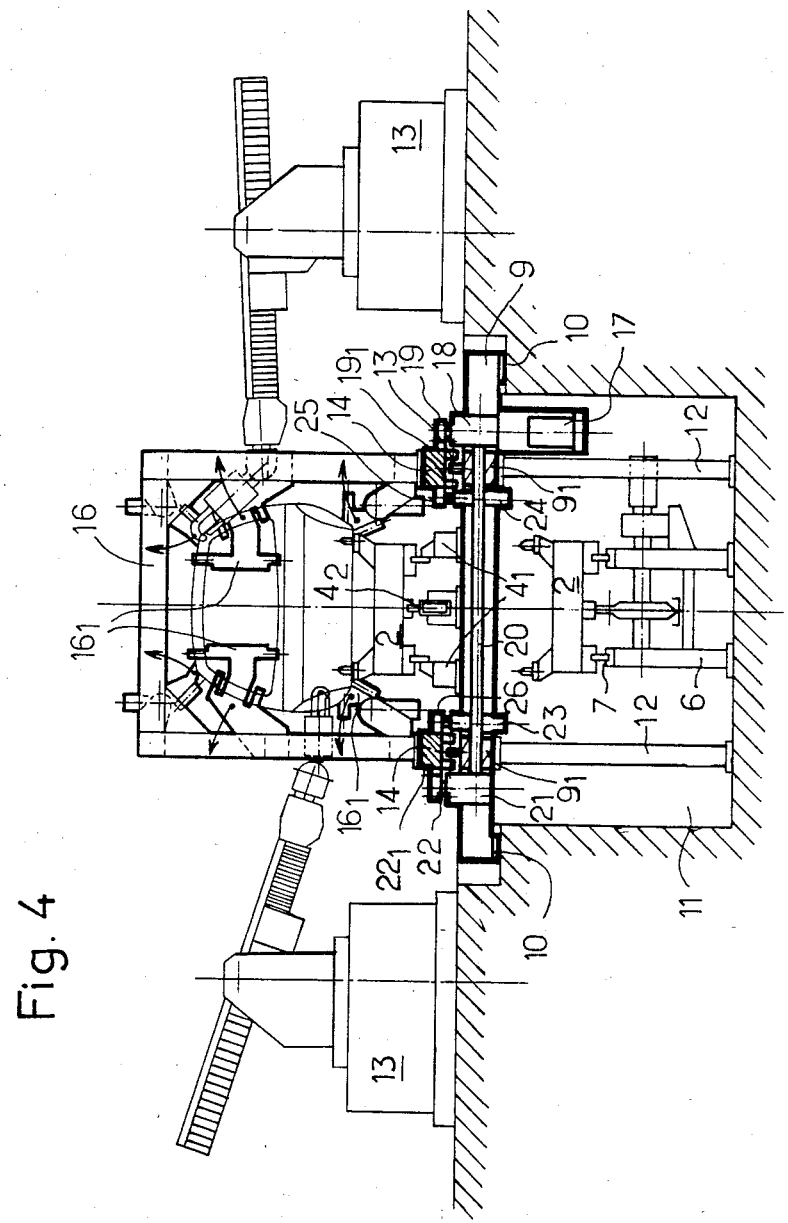

The invention is illustrated by way of non-limiting example in the attached drawings, in which FIG. 1 represents a longitudinal section through the installation according to the invention, FIG. 2 is a top plan view of FIG. 1, FIG. 3 shows on an enlarged scale the assembly station of FIG. 1, and FIG. 4 represents a transverse section taken on the line A—A of FIG. 3.

The installation according to the invention represented in the attached drawings is more particularly adapted to the pinning of preassembled car bodies but it could also be used as a final welding installation without major modification.

According to FIGS. 1 and 2, the preassembled car bodies are each positioned on a carriage 2 at the end A of the installation. These carriages, which are supported by the conveyor track 4, then shift these car bodies in the direction of the arrow F to take them to the pinning station at B and then, after pinning, to the end C of the installation, where the pinned bodies are taken away. A lift 6 situated under the conveyor track 4 then successively lowers the emptied carriages to place them on an endless conveyor chain 7 which is arranged parallel to and under the conveyor track 4 to return these carriages to the front end A of the installation.

On arrival at this front end A of the installation, a second lift 8 successively raises the carriages presented to it to place them back on the conveyor track 4 where they are then ready to receive one of the models of car body to be pinned.

A rigid and fixed, elongated stand is provided at the level of the pinning station B. This stand bears with its longitudinal sides against the lateral shoulders 10 (see FIG. 4) provided on each side of a concrete pit 11 inside which is arranged the conveyor 7 and the lifts 6 and 8.

This rigid stand 9, as also the conveyor track 4, rests on the base of the pit 11 by means of uprights 12.

On each side of the stand 9 and at the level of the pinning station B are fixed the welding robots 13 used for pinning the car body.

The stand 9 has two longitudinal rails $9_1$ on which a rigid frame 14 is displaceable by means of roller cases 13. At least two gantry structures 15 and 16 are fixed to this rigid frame 14.

These gantries 15 and 16 are each provided with positioning and holding devices $15_1$, $16_1$ corresponding to a model of car body which is to be pinned, and one or other of these gantries is carried to the level of the pinning station B by displacement of the frame 14, depending on the model of car body brought to this station 4 by each carriage 2.

The frame 14 is displaced by means of two electric motors 17 which drive a first bevel gear case 18. One of the output ends of this gear case drives a pinion 19 which meshes with a toothed rack $19_1$ provided on the external lateral surface of one of the long side bars of the frame 14.

The second outlet of the bevel gear case 18 has a transverse shaft 20 which is connected, on the side opposite the stand 9, to a second bevel gear case 21 provided with an output pinion 22 meshing with a rack $22_1$ provided on the external lateral surface of the second side bar of the frame 14.

This arrangement ensures a rigorous movement of translation of the rigid assembly consisting of the frame 14 and the inverted U-shaped gantries 15 and 16 which are fixed thereto.

The means for locking the frame 14 in relation to the stand 9 for the purpose of positioning one or other of the gantries 15 and 16 at the level of the pinning station B consist of pilots 23 and 24 which are attached to the stand 9 and preferably to its long bars 9 and are designed to fit into corresponding seatings 25 and 26 on the frame 14.

The conveyor track 4 for the carriage 2 consists of two rails $4_1$ arranged parallel to each other inside the stand 9 and frame 14. The carriages are displaced on these rails by a transfer device $4_2$, for example a chain, driven by an electric motor.

If pinning is to be carried out on a car body different from that which has previously been pinned, all that is necessary is to release the frame 14 from the stand 9 by operating the locking means 23, 24, 25 and 26 and then switch on one of the motors 17 to displace the frame 14 and carry the corresponding gantry to the model of car body which is to be pinned at the level of the pinning station B. The frame 14 is then locked again.

During this transfer of the gantries 15 and 16, the conveyor track 4 carries the required car body model to the level of this pinning station, and the positioning and holding devices $16_1$ are put into operation for accurately positioning the sub-assemblies of the car body, which are then pinned by point welding by means of the welding robots 13.

In the description given above, the welding devices are in the form of robots arranged laterally to the stand 9, but some or all of the welding points could equally well be made by means of welding devices directly attached to the gantries if this is found to be convenient. Equally, a welding robot could be arranged in a fixed position above the gantries to be suspended under a stand or support placed above the gantries 15 or 16 at the level of the pinning station B.

We claim:

1. Installation for the assembly and in particular for the pinning of car bodies of motor vehicles comprising carriages for supporting the car bodies which are to be assembled by welding, and means for displacing said carriages to an assembly station provided with welding equipment, said installation comprises a rigid and fixed stand, a rigid frame which reciprocates on the stand in a direction parallel to the movement of the carriages and at least two gantries rigidly fixed to said frame, each said gantry comprising positioning and holding means for a particular model of car body to be welded, means for reciprocating the frame on the stand in a direction parallel to displacement of the carriages and means for locking the frame in relation to the stand so as to position one of the gantries in the assembly station.

2. Installation according to claim 1, characterised in that the means for displacing the carriages are arranged in the interior of the stand and of the frame parallel to the sense of displacement of the frame on this stand.

3. Installation according to claim 1, characterised in that each gantry supports welding equipment.

* * * * *